US007541009B2

(12) United States Patent
Takao et al.

(10) Patent No.: US 7,541,009 B2
(45) Date of Patent: Jun. 2, 2009

(54) APPARATUS FOR PRODUCING HYDRATE SLURRY

(75) Inventors: Shingo Takao, Yokohama (JP); Shigenori Matsumoto, Yokohama (JP); Hidemasa Ogoshi, Yokohama (JP); Naoyuki Furumoto, Yokohama (JP)

(73) Assignee: JFE Engineering Corporation, Tokyo (JP)

( * ) Notice: Subject to any disclaimer, the term of this patent is extended or adjusted under 35 U.S.C. 154(b) by 594 days.

(21) Appl. No.: 10/514,981

(22) PCT Filed: Mar. 14, 2003

(86) PCT No.: PCT/JP03/03049

§ 371 (c)(1),
(2), (4) Date: Apr. 6, 2005

(87) PCT Pub. No.: WO03/102474

PCT Pub. Date: Dec. 11, 2003

(65) Prior Publication Data

US 2005/0163681 A1    Jul. 28, 2005

(30) Foreign Application Priority Data

May 31, 2002 (JP) ............................. 2002-159042
Sep. 2, 2002 (JP) ............................. 2002-256900

(51) Int. Cl.
*B01J 19/00* (2006.01)
*F17C 5/00* (2006.01)

(52) U.S. Cl. ........................... 422/198; 62/54.1; 62/434

(58) Field of Classification Search ................. 422/198; 62/54.1, 434
See application file for complete search history.

(56) References Cited

U.S. PATENT DOCUMENTS

| 2,802,344 A | 8/1957 | Witherell |
| 3,309,885 A | 3/1967 | Phillips et al. |
| 3,834,456 A | 9/1974 | Clarke et al. |
| 3,976,584 A | 8/1976 | Leifer |
| 4,024,170 A | 5/1977 | Atwood |

(Continued)

FOREIGN PATENT DOCUMENTS

EP    1 235 046 A    8/2002

(Continued)

OTHER PUBLICATIONS

Patent Abstracts of Japan, vol. 2003, No. 01, Jan. 14, 2003 of JP 2002-263470 A (NKK Corp), Sep. 17, 2002.

(Continued)

*Primary Examiner*—Nina Bhat
(74) *Attorney, Agent, or Firm*—Frishauf, Holtz, Goodman & Chick, P.C.

(57) ABSTRACT

An apparatus produces hydrate slurry, which is a mixture of aqueous solution and hydrate, by cooling aqueous solution containing a guest compound, which generates the hydrate at temperature higher than 0° C., by using a cooling medium. The apparatus includes a first heat exchanger for supercooling the aqueous solution while holding the aqueous solution in a liquid state and in a second heat exchanger, which is provided on the downstream side of the first heat exchanger for cooling hydrate slurry.

22 Claims, 9 Drawing Sheets

U.S. PATENT DOCUMENTS

| | | | |
|---|---|---|---|
| 4,180,124 A | 12/1979 | Schurliff | |
| 4,188,359 A | 2/1980 | Quinlan | |
| 4,217,329 A | 8/1980 | Quinlan | |
| 4,332,690 A | 6/1982 | Kimura et al. | |
| 4,336,156 A | 6/1982 | Quinlan | |
| 4,341,657 A | 7/1982 | Quinlan | |
| 4,498,997 A | 2/1985 | Walker | |
| 4,522,658 A | 6/1985 | Walker | |
| 4,585,572 A | 4/1986 | Lane et al. | |
| 4,585,843 A | 4/1986 | Flesher et al. | |
| 4,686,059 A | 8/1987 | Payerle | |
| 4,796,439 A | 1/1989 | Yamada et al. | |
| 4,821,794 A | 4/1989 | Tsai et al. | |
| 5,128,051 A | 7/1992 | Theis et al. | |
| 5,139,549 A | 8/1992 | Knodel et al. | |
| 5,140,824 A | 8/1992 | Hunt | |
| 5,159,971 A | 11/1992 | Li | |
| 5,239,839 A | 8/1993 | James | |
| 5,434,330 A | 7/1995 | Hnatow et al. | |
| 5,473,904 A | 12/1995 | Guo et al. | |
| 5,477,917 A | 12/1995 | Salyer | |
| 5,497,630 A | 3/1996 | Stein et al. | |
| 5,524,453 A | 6/1996 | James | |
| 5,758,502 A | 6/1998 | Utamura et al. | |
| 5,778,685 A | 7/1998 | Singh et al. | |
| 5,979,479 A | 11/1999 | Hellsten et al. | |
| 6,028,234 A | 2/2000 | Heinemann et al. | |
| 6,059,016 A | 5/2000 | Rafalovich et al. | |
| 6,082,118 A | 7/2000 | Endrizzi et al. | |
| 6,096,680 A | 8/2000 | Park | |
| 6,158,499 A | 12/2000 | Rhodes et al. | |
| 6,162,391 A | 12/2000 | Kowata et al. | |
| 6,237,346 B1 | 5/2001 | Ogoshi et al. | |
| 6,268,317 B1 | 7/2001 | Kawakami et al. | |
| 6,303,080 B1 | 10/2001 | Tuma | |
| 6,350,928 B1 | 2/2002 | Waycuilis et al. | |
| 6,370,908 B1 | 4/2002 | James | |
| 6,374,907 B1 | 4/2002 | Tousignant et al. | |
| 6,393,861 B1 | 5/2002 | Levenduski et al. | |
| 6,408,633 B1 | 6/2002 | Carr et al. | |
| 6,432,320 B1 | 8/2002 | Bonsignore et al. | |
| 6,481,213 B2 | 11/2002 | Carr et al. | |
| 6,510,698 B2 | 1/2003 | Kasai et al. | |
| 6,528,025 B1 | 3/2003 | Boesch et al. | |
| 6,560,971 B2 * | 5/2003 | Takao et al. | 62/54.1 |
| 6,562,121 B2 | 5/2003 | Nickel et al. | |
| 6,584,793 B2 | 7/2003 | Fukushima et al. | |
| 6,653,516 B1 | 11/2003 | Yoshikawa et al. | |
| 6,681,593 B1 | 1/2004 | Gundlach | |
| 6,701,742 B2 | 3/2004 | Mack et al. | |
| 6,703,534 B2 | 3/2004 | Waycuilis et al. | |
| 6,858,157 B2 | 2/2005 | Davidson et al. | |
| 6,994,156 B2 | 2/2006 | Kopko | |
| 7,032,398 B2 | 4/2006 | Dilk et al. | |
| 7,246,506 B2 * | 7/2007 | Takao et al. | 62/430 |
| 2001/0047662 A1 | 12/2001 | Takao et al. | |
| 2002/0014329 A1 | 2/2002 | Carr et al. | |
| 2002/0083720 A1 | 7/2002 | Takao et al. | |
| 2002/0189277 A1 | 12/2002 | Takao et al. | |
| 2003/0151030 A1 | 8/2003 | Gurin | |
| 2004/0020123 A1 | 2/2004 | Kimura | |
| 2004/0069454 A1 | 4/2004 | Bonsignore et al. | |
| 2004/0162452 A1 | 8/2004 | Waycuilis | |
| 2004/0211205 A1 | 10/2004 | Spinner et al. | |
| 2005/0016200 A1 | 1/2005 | Takao et al. | |
| 2005/0163681 A1 | 7/2005 | Takao et al. | |
| 2005/0262870 A1 | 12/2005 | Narayanamurthy et al. | |
| 2006/0005558 A1 | 1/2006 | Otake et al. | |
| 2006/0009664 A1 | 1/2006 | Lokshin et al. | |
| 2006/0070385 A1 | 4/2006 | Narayanamurthy et al. | |

FOREIGN PATENT DOCUMENTS

| | | |
|---|---|---|
| JP | 58-32279 | 3/1983 |
| JP | 58-168891 | 10/1983 |
| JP | 59-134494 | 8/1984 |
| JP | 61-7376 | 1/1986 |
| JP | 61-145274 | 7/1986 |
| JP | 1-88327 | 6/1989 |
| JP | 7-19682 | 1/1990 |
| JP | 2-40431 | 2/1990 |
| JP | 2-203138 | 8/1990 |
| JP | 2-122980 | 10/1990 |
| JP | 2-122981 | 10/1990 |
| JP | 5-149656 | 6/1993 |
| JP | 6-46179 | 6/1994 |
| JP | 6-159963 | 6/1994 |
| JP | 07-004801 A | 1/1995 |
| JP | 9-157640 | 6/1997 |
| JP | 9-291272 | 11/1997 |
| JP | 2863226 | 12/1998 |
| JP | 11-264681 | 9/1999 |
| JP | 2000-111285 A | 4/2000 |
| JP | 2000-233101 | 8/2000 |
| JP | 2001-172617 A | 6/2001 |
| JP | 2001-280874 | 10/2001 |
| JP | 2001-343139 A | 12/2001 |
| JP | 2002-62073 A | 2/2002 |
| JP | 3407658 A | 3/2003 |

OTHER PUBLICATIONS

Patent Abstracts of Japan, vol. 2002, No. 04, Aug. 4, 2002 of JP 2001-343139 A (NKK Corp), Dec. 14, 2001.
Patent Abstracts of Japan, vol. 2000, No. 07, Sep. 29, 2002 of JP 2000-096041 A (NKK Corp), Apr. 4, 2000.
Patent Abstracts of Japan, vol. 2002, No. 02, Apr. 2, 2002 of JP 2001-280875 A (NKK Corp), Oct. 10, 2001.

* cited by examiner

APPARATUS FOR PRODUCING HYDRATE SLURRY

This application is a U.S. National Phase Application under 35 USC 371 of International Application PCT/JP03/03049 filed Mar. 14, 2003.

FIELD OF THE INVENTION

The present invention relates to an apparatus for generating hydrate slurry. The present invention relates, particularly, to an apparatus for generating hydrate slurry that is usable for a cold transporting medium in an air-conditioning facility or an industrial facility to use cold thermal storage.

BACKGROUND OF THE INVENTION

When aqueous solution that contains a guest compound (herein, the guest compound is formed as salts. That is, such as tetra-n-butyl ammonium salt, tetra-iso-amyl ammonium salt, tetra-iso-butyl phosphonium salt, tri-iso-amyl sulfonium salt and etc.). The aqueous solution is cooled, the guest compound is enclosed in a cage-shaped clathrate lattice formed by water molecules, which are host molecules. And the guest compound is crystallized to form a hydrate (liquid clathrate hydrate). The hydrate is generated at equal or higher temperature of 0° C. at atmospheric pressure. The hydrate makes it possible to store the cold heating amount, whose value is several times that of cold water because of the bigger latent heat. The hydrate is composed of fine crystal grains. And the hydrate is suspended in aqueous solution, so that the hydrate exists in a shape of hydrate slurry, which possesses relatively high fluidity. Therefore, such hydrate slurry possesses a preferable characteristic usable for a cold transporting medium for an air-conditioning facility or for an industrial facility to use a cold thermal storage.

Conventionally, cooling aqueous solution that contains a guest compound has generated the above-described hydrate slurry, by means of exchanging heat between the cold medium (such as cold water) and the aqueous solution, by using one set of the heat exchanger. In this case, when the aqueous solution that contains a guest compound is cooled, supercooling occurs. As a result, the hydrate sometimes exists as a form of the aqueous solution at the lower temperature than the temperature, at which the hydrate generates. After the aqueous solution is supercooled in the heat exchanger, supercooling the aqueous solution is canceled on a heat transfer surface in the heat exchanger. At such a procedure, the generated hydrate is easy to be adhered to the heat transfer surface in the heat exchanger. The adhesion degrades the heat transfer performance of the heat exchanger. Furthermore, some case happens that the aqueous solution is supercooled to a great extent in the heat exchanger, and afterwards, supercooling is canceled. In such a case, the hydrate is generated rapidly, so that the viscosity of the hydrate slurry increases, and also the flow resistance and the pressure losses increase. As a result, the corresponding pump power is required to increase. And in the worst case, blocking happens in some part of the heat exchanger. As described above, it causes an unstable system operation to cancel the supercooling of aqueous solution in the heat exchanger.

Additionally, in order for the conventional method to generate the hydrate slurry that possesses a predetermined heat density, the cold water cooled by a refrigerating machine and the aqueous solution that contains a guest compound are transported in some sorts of the heat exchanger. The heat exchanger has a large heat transfer area, such as a plate type one or a multitubular type one. In the conventional method, the mutual materials are exchanged in such a way.

The reason why the above-mentioned disadvantage happens is that it is difficult to generate directly the hydrate slurry that has a predetermined heat density by cooling the aqueous solution, which contains a guest compound by means of exchanging the mutual heat in an evaporator of the refrigerating machine. That is to say, if an attempt is made to generate the hydrate slurry by means of exchanging the mutual heat in the evaporator, the heat resistance increases. Because the viscosity of the hydrate slurry is higher than that of water and the hydrate is apt to adhere to the cooling surface. On the other hand, since the heat transfer area of evaporator is small, it may be that the heat resistance is large, it is very difficult to generate directly the hydrate slurry that has the predetermined heat density.

However, in the above-described conventional apparatus for generating the hydrate slurry, a pump for cold water and a pump for hydrate slurry are required, in addition to a plate type or multitubular type heat exchanger. This requirement invited some sorts of problems such that the equipment cost becomes higher and the energy consumption becomes higher.

SUMMARY OF THE INVENTION

The present invention provides an apparatus for generating hydrate slurry efficiently by preventing aqueous solution on a heat transfer surface in a heat exchanger from canceling the supercooling.

In order to attain the object, the present invention provides an apparatus for generating hydrate slurry. The hydrate slurry is a mixture of aqueous solution and a hydrate. Cooling aqueous solution that contains a guest compound by using a cooling medium generates the hydrate slurry. The guest compound generates the hydrate at temperature of more than 0° C. The apparatus comprises a first heat exchanger and a second heat exchanger. The first heat exchanger supercools the aqueous solution during holding the aqueous solution in a liquid state. And the second heat exchanger cools the hydrate slurry. The second heat exchanger is located on the downstream side of the first heat exchanger.

In accordance with the present invention, when generating the hydrate slurry in the apparatus, it is preferable that means for canceling the supercooling of aqueous solution are located between the first heat exchanger and the second heat exchanger.

In the apparatus for generating the hydrate slurry, in accordance with the present invention, it is preferable that a plurality of the second heat exchangers is provided so as to be switchable.

As means for canceling the supercooling, for example, means for injecting hydrate slurry into supercooled aqueous solution are cited. In the present invention, it is preferably equal or higher than 0.7° C., how degree the aqueous solution is supercooled by the first heat exchanger. Here, the supercooling degree is defined as a difference between the starting temperature, at which the hydrate begins to generate from the aqueous solution possessing a determined concentration and the temperature of the supercooled aqueous solution. Also, it is preferable that the quantity of the hydrate slurry injected into the aqueous solution supercooled by the first heat exchanger is 1 vol % or more, more preferably 1.8 vol % or more, of the total quantity of the aqueous solution. Also, the Reynolds number of the aqueous solution is preferably 4500 or more.

The hydrate slurry introduced into the supercooled aqueous solution may be the hydrate slurry generated by the second heat exchanger, or may be the hydrate slurry stored in a thermal storage tank for the hydrate slurry.

Also, as means for canceling the supercooling, a cooling portion of a small refrigerating machine, a low-temperature protrusion, an oscillating portion of an ultrasonic oscillator, a low-frequency oscillator, a static mixer, a mixing blade, a pump, or the like is used.

As described above, when a plural of the second heat exchanger is provided so as to be switchable, the operation can be switched over, as described below. For example, when adhered hydrate is detected in the second heat exchanger to be used to generate the hydrate slurry among the plural of the second heat exchanger, it makes it possible to operate the system in such a way that the hydrate slurry stops being generated in the second heat exchanger. And in this case, the second heat exchanger is switched over to another one to continue to generate the hydrate slurry. And, the hydrate slurry in the second heat exchanger, in which it stopped generating the hydrate slurry, starts melting. Also, the plurality of the second heat exchanger may be switched over successively at the fixed time interval for performing the melting operation.

In order to attain another object, the present invention provides an apparatus for generating hydrate slurry. The apparatus enables the cost to be reduced, and the apparatus enables the energy to be saved, by economizing a plate type or multitubular type heat exchanger and a pump.

In order to attain the above-mentioned objects, the present invention provides an apparatus for generating hydrate slurry that contains hydrate of guest compound by cooling aqueous solution that contains a guest compound, which generates hydrate at equal or high temperature of 0° C.

The apparatus comprises:
 a refrigerating machine having a plurality of evaporators provided so as to be switchable;
 a composed circulation system for the aqueous solution of the guest compound, so as to cool the aqueous solution of the guest compound by each of said evaporators;
 control means for stopping cooling the aqueous solution of the guest compound in one evaporator when the circulation system for the aqueous solution of the guest compound in the evaporator is blocked, and for starting cooling the aqueous solution of the guest compound in another evaporator; and
 means for supplying a high-temperature refrigerant in said refrigerating machine to an evaporator, in which cooling the aqueous solution of the guest compound stops.

In accordance with the present invention, the apparatus for generating hydrate slurry preferably provides means for detecting whether or not the circulation system arranged in the evaporator is blocked by hydrate.

As one of the detecting means, at least one of the following is used. For instance, the means are a flow-meter, a thermometer provided on an outlet pipe from the evaporator of the circulation system and a differential pressure gage provided across an inlet pipe to the evaporator of the circulation system and the outlet pipe from the evaporator.

As for generating the hydrate slurry in accordance with the present invention, for instance, a generating apparatus which has the refrigerating machine as an absorption refrigerating machine. And the apparatus has means for supplying refrigerant gas generated in the generator to the evaporator in which cooling the aqueous solution of the guest compound stops.

In accordance with the present invention, the apparatus for generating the hydrate slurry may be the refrigerating machine, which is a compression refrigerating machine, and which has means for supplying refrigerant gas generated in the compressor to the evaporator, where cooling aqueous solution of the guest compound stops.

Furthermore, the apparatus for generating the hydrate slurry, may be a case, the refrigerating machine, which is the compression refrigerating machine, and which has means for supplying refrigerant liquid generated in a condenser to the evaporator, where cooling aqueous solution of the guest compound stops.

In accordance with the present invention, the apparatus for generating the hydrate slurry is preferable, in which the aqueous solution of the guest compound is supercooled in the circulation system arranged in the evaporator. And the apparatus has means for canceling the supercooled state of the supercooled aqueous solution to generate the hydrate slurry. The means are located on an outlet pipe of the circulation system for the aqueous solution of the guest compound from the evaporator.

As the means for canceling supercooling, a cooling portion of a small refrigerating machine, a low-temperature protrusion, an oscillating portion of an ultrasonic oscillator, a low-frequency oscillator, hydrate slurry injecting means, a static mixer, a mixing blade, a pump, or the like can be applied to the apparatus.

As the guest compound used in the apparatus generating the hydrate slurry, at least one kind selected from a group consisting of tetra-n-butyl ammonium salt, tetra-iso-amyl ammonium salt, tetra-iso-butyl phosphonium salt, and tri-iso-amyl sulfonium salt is used.

DESCRIPTION OF THE PREFERRED EMBODIMENTS

Embodiment 1

Figure 1:
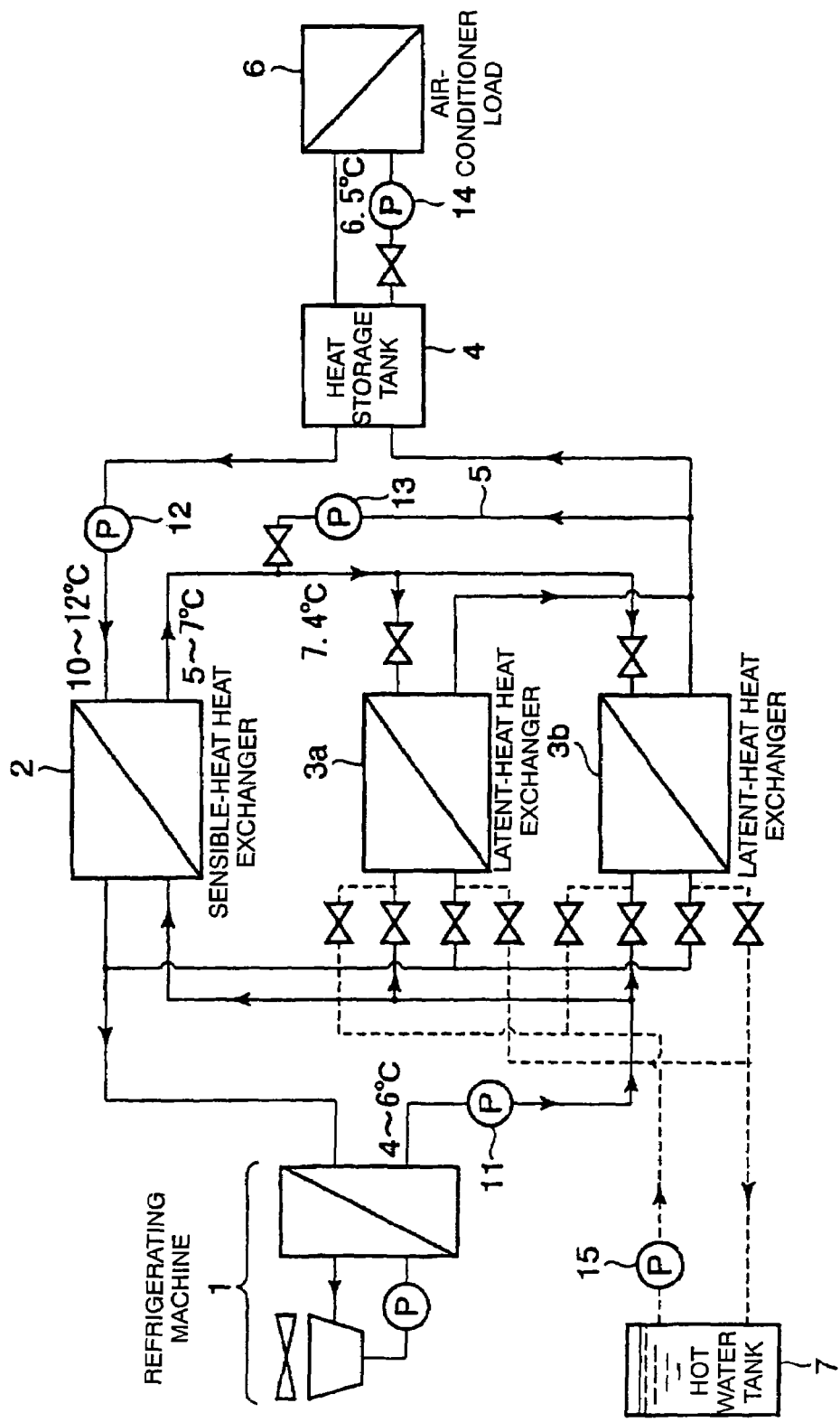
FIG. 1 is a schematic drawing of an air-conditioning system including an apparatus for generating hydrate slurry, as one example of the present invention.

The term "guest compound" used in the present invention is defined as a compound, which is enclosed in a cage-shaped clathrate lattice formed by water molecules, which are host molecules, at temperature of 0° C. or more. The guest compound is crystallized to generate a hydrate (liquid clathrate hydrate) by cooling the aqueous solution at atmospheric pressure. As the guest compound, tetra-n-butyl ammonium salt, tetra-iso-amyl ammonium salt, tetra-n-butyl phosphonium salt, tetra-iso-amyl sulfonium salt, and the like are cited. The hydrate slurry, where the hydrate of the guest compound is mixed in aqueous solution, possesses preferable characteristics as a cold transporting medium for an air-conditioning facility or an industrial facility to use a cold thermal storage. However, as described above, it happens some sort of the problem that the heat transfer performance of the heat exchanger decrease, the pump power increases, resulting in the blocking of heat exchanger, due to canceling the supercooling of aqueous solution.

In the apparatus for generating the hydrate slurry, a heat exchanger for generating the hydrate slurry is separated into the first heat exchanger and the second heat exchanger. The first one is for supercooling aqueous solution during holding the aqueous solution in a liquid state. The other one is located downstream to the first heat exchanger in order to cool the hydrate slurry. Therefore, it becomes easy to avoid canceling the supercooling in the heat exchanger. As a result, it becomes easy to take the countermeasures against such a problem that is caused by canceling the supercooling of the hydrate slurry.

Canceling the supercooling of the hydrate slurry prevents the hydrate slurry from being generated rapidly in the heat exchanger. Consequently, the hydrate does not adhere to a heat transfer surface of the heat exchanger. Therefore, it enables the heat exchanger to possess the minimized heat transfer area. And it enables the heat exchanger to increase the flow velocity of the hydrate slurry without decreasing the flow velocity of the hydrate slurry in the viewpoint of performance. And the apparatus for generating the hydrate slurry can obtain the optimized apparatus for continuing the operation.

Aqueous solution is supercooled heavily in the heat exchanger. Afterwards, the supercooling is canceled. In this case, a hydrate is generated suddenly. As a result, the viscosity of the hydrate slurry increases, resulting in increasing the flow resistance and the pressure losses. Consequently, the required pump power increases. In the worst case, the blocking happens in the heat exchanger. As described above, canceling the supercooling of aqueous solution invites the unstable system operation in the heat exchanger. The apparatus for generating the hydrate slurry in accordance with the present invention can avoid the aforementioned problems.

In the exemplary embodiment, hereinafter, the first heat exchanger is defined as a sensible-heat heat exchanger because of absorbing sensible heat from aqueous solution and because of supercooling the aqueous solution during keeping the aqueous solution in a liquid state. The second heat exchanger is also defined as a latent-heat heat exchanger. Because the heat exchanger absorbs the latent heat for transferring from the aqueous solution to the hydrate (in the actual situation, the heat exchanger absorbs the sensible heat from the hydrate slurry at the same time), in order to cool hydrate slurry.

The apparatus for generating the hydrate slurry in accordance with the present invention, sometimes, provides means for canceling the supercooling of aqueous solution, which is located between the first heat exchanger (sensible-heat heat exchanger) and the second heat exchanger (latent-heat heat exchanger). There is hardly fear such as canceling the supercooling of the aqueous solution in the heat exchanger. So, particularly, canceling the supercooling prevents the heat exchanger from blocking in the heat exchanger.

It may be a case, such as provided means for injecting the hydrate slurry into the supercooled aqueous solution. Such means are those for canceling the supercooling. In this case, the supercooled degree of the aqueous solution by the first heat exchanger (sensible-heat heat exchanger) is determined to the supercooled degree of equal or higher than 0.7° C. Otherwise, the quantity of the hydrate slurry injected into the supercooled aqueous solution by the first heat exchanger is determined to the degree of the equal or more than 1 vol %. Preferably the degree is the equal or more than 1.8 vol %. Regardless of the supercooled degree, the Reynolds number of the aqueous solution is applied to canceling the supercooled aqueous solution, whose number is the equal or more than 4500.

The hydrate slurry injected into the supercooled aqueous solution obtains the same effect as those resulting from generating the hydrate slurry by the second heat exchanger (latent-heat heat exchanger) or those resulting from using the hydrate slurry that is stored in a thermal storage tank for the hydrate slurry.

Furthermore, the following means obtains the same as the above-mentioned effect. For instance, a cooling portion of a small refrigerating machine, a low-temperature protrusion, an oscillating portion of an ultrasonic oscillator, a low-frequency oscillator, a static mixer, a mixing blade, a pump, or the like is applied to the means for canceling the supercooling of the aqueous solution.

There may be a case that a plurality of the second heat exchanger (latent-heat heat exchanger) is provided so as to be switchable. In such a case, when the adhered hydrate is detected in the second exchanger, which is used for generating the hydrate slurry, another second heat exchanger is switched over in order to continue generating the hydrate slurry. At the same time, the previous second heat exchanger, which stopped generating the hydrate slurry, becomes usable for melting-operation. As a result, the hydrate slurry is obtained with high efficiency.

A sign is detected by the method described below, whether the hydrate is adhered to or not and whether the blocking happens or not. For example, there is a sign that the flow resistance is the equal or less than the predetermined value, or that the flow rate is the equal or less than the predetermined value. Otherwise, there is a sign that the exchanged heating value is the equal or less than the predetermined value. Such signs are detected by measuring the pressure losses, the flow rate, and the temperature in the pipe.

Furthermore, the melting operation by successive switching over the plurality of the second heat exchanger (latent-heat heat exchanger) at the fixed time interval makes it possible to eliminate a device for detecting the adhered hydrate in the second heat exchanger, resulting in simplifying the system.

EXAMPLE

As one of the exemplary embodiments, one example is described in accordance with the drawing, as follows.

As one example of the present invention, FIG. 1 shows an air-conditioning system that incorporates an apparatus for generating hydrate slurry. First, essential components in the air-conditioning system are schematically explained. A refrigerating machine 1, which includes a cooling tower, pump, heat exchangers, etc., generates cold water serving as a cold thermal medium for cooling aqueous solution and hydrate slurry.

As the heat exchanger for generating the hydrate slurry, a two-stage heat exchanger is provided. A sensible-heat heat exchanger (first heat exchanger) 2 cools the aqueous solution by means for exchanging heat with the cold water. Two latent-heat heat exchangers (second heat exchangers) 3a and 3b located on the downstream side of the sensible-heat heat exchanger 2 cool hydrate slurry by means for exchanging heat with the cold water. Although the cold water generated by the refrigerating machine 1 is supplied to the sensible-heat heat exchanger 2 and the latent-heat heat exchangers 3a and 3b in parallel in the example shown in FIG. 1, the cold water may be supplied to each device in series. The number of latent-heat heat exchangers may be three or more. The aqueous solution that contains a guest compound is sent to the sensible-heat heat exchanger 2 from a thermal storage tank 4. The aqueous solution is cooled to the degree of a supercooled state. And either one of the latent-heat heat exchangers 3a and 3b further cools the hydrate slurry generated by canceling the supercooling of the aqueous solution on the downstream side of the sensible-heat heat exchanger 2. And the hydrate slurry returns to the thermal storage tank 4. In the system, an injection pipe is connected to a pipe between the sensible-heat heat exchanger 2 and the latent-heat heat exchangers 3a and 3b from a pipe on the downstream side of the latent-heat heat exchangers 3a and 3b. By way of the connected injection pipe, some of the hydrate slurry is injected into the aqueous solution in a supercooled state. Such process brings up canceling the supercooling of the aqueous solution. The hydrate slurry is sent from the thermal storage tank 4 to air-conditioner load 6, and the aqueous solution, whose cold thermal storage is consumed in the air-conditioner load 6, returns to the thermal storage tank 4. From a hot water tank 7, hot water is sent to the latent-heat heat exchanger 3a or 3b that requires melting operation for the hydrate slurry.

Although the aqueous solution and the hydrate slurry are cooled by using the cold water generated by the refrigerating machine 1 as a cooling medium in FIG. 1, the cold water taken out of, for example, an ice thermal storage tank may be usable for a cooling medium. Also, although the thermal storage tank 4 is provided in FIG. 1, the thermal storage tank is not always required. And the hydrate slurry generated by the latent-heat heat exchanger may be sent directly to the air-conditioner load.

Herein after, the operation of the air-conditioning system shown in FIG. 1 is explained in more detail.

When the system starts, there is no hydrate slurry. And the aqueous solution that contains a guest compound (for example, tetra-n-butyl ammonium bromide (TBAB)) is stored in the thermal storage tank 4. The concentration of the guest compound in the aqueous solution is determined, which is suitable to the air-conditioner load in the air-conditioning system. Changing the concentration enables the heat density of the hydrate slurry and the temperature of cold water to be variable, so as to be suitable to the air-conditioner load, provided in the air-conditioning system. In the exemplary example, the concentration is determined to be about 20-wt %. Before it starts operating the air-conditioning, the hydrate slurry has been prepared. First, the aqueous solution in the thermal storage tank 4 is circulated to the thermal storage tank 4 through the sensible-heat heat exchanger 2 and one latent-heat heat exchanger 3a by using a generation pump 12. The other latent-heat heat exchanger 3b is not used. Next, the refrigerating machine 1 is operated to circulate cold water of 4 to 6° C. generated by the heat exchanger in the refrigerating machine 1 to the heat exchanger in the refrigerating machine 1 through the sensible-heat heat exchanger 2 and the latent-heat heat exchanger 3a by using a cold water pump 11. At the same time, the aqueous solution is cooled by the sensible-heat heat exchanger 2 to the degree such that supercooling is canceled naturally, and a small quantity of the hydrate slurry is generated. Further, the hydrate slurry is generated to the extent of enabling the system to operate for the load of the air-conditioning, while the hydrate slurry is cooled by the latent-heat heat exchanger 3a. Thus, first, the aqueous solution is flown in the apparatus for generating the hydrate slurry. And afterwards, the cooling water as a cooling medium is flown. Such a process prevents the latent-heat heat exchanger from blocking, during generating the hydrate slurry.

Next, the aqueous solution is supercooled by the sensible-heat heat exchanger 2. The degree of supercooling the aqueous solution is determined to set at 0.7° C. or more (the temperature of the aqueous solution will not be equal or lower than the temperature of the cold water, which is a cooling medium). Then, an injection pump 13 operates in order to inject the hydrate slurry into the aqueous solution in a supercooled state. Here, the aqueous solution in a supercooled state flows in the pipe between the sensible-heat heat exchanger 2 and the latent-heat heat exchanger 3a. And here, the hydrate slurry is injected from the pipe on the downstream side of the latent-heat heat exchanger 3a by way of the injection pipe 5. The hydrate in the injected hydrate slurry serves as a nucleus for generating the hydrate in the aqueous solution. Thus, the supercooled state of the aqueous solution, which is supercooled by the sensible-heat heat exchanger 2, is canceled to generate the hydrate slurry, which has a low solid phase ratio. Subsequently, the hydrate slurry is further cooled by the latent-heat heat exchanger 3a. Since the hydrate slurry is sent to the latent-heat heat exchanger 3a, supercooling has already been canceled at that time. At such a time, the flow rate of the cold water is controlled, which flows into the latent-heat heat exchanger 3a. The hydrate slurry, which possesses a desired heat density according to the load for air-conditioner 6, is generated. Thus, the operation can be shifted to a highly efficient operation to generate the hydrate slurry. And the air-conditioning can initialize the operation.

At the time of the air-conditioning operation, the aqueous solution of 10 to 12° C., which has returned to the thermal storage tank 4 from the load for air-conditioner 6, is sent to the sensible-heat heat exchanger 2 by the generation pump 12 and is supercooled to degree of the temperature 5 to 7° C. Supercooling is canceled by injecting the hydrate slurry through the injection pipe 5, which leads to generating the hydrate slurry, whose degree is about 7.4° C. The hydrate slurry is further cooled by the latent-heat heat exchanger 3a and the hydrate slurry returns to the thermal storage tank 4. From the thermal storage tank 4, the hydrate slurry possessing the degree of about 6.5° C. is sent to the load for air-conditioner 6, by a load pump 14. At this time, the heat density of hydrate slurry is controlled so that the total power to be required for both conveying power to the heat exchanger and conveying power to the load is minimized. In the way, it becomes possible to save the energy to operate the apparatus.

During operating the air-conditioning system, judging from the viewpoint that the hydrate slurry begins to adhere to the heat transfer surface of the latent-heat heat exchanger 3a, generating the hydrate slurry in the latent-heat heat exchanger 3a stops, in order to prevent the hydrate slurry form blocking. And the hydrate slurry continues to generate, switching over the heat exchanger to the latent-heat heat exchanger 3b. The latent-heat heat exchanger 3a enters into the operation stage for melting. It is judged whether the hydrate slurry adheres to the heat transfer surface of the latent-heat heat exchanger or not, by monitoring the flow rate of the hydrate slurry with a provided flowmeter (not shown in the drawing). For example, such judgment is done, based on monitoring the flow rate of the hydrate slurry. And the judgement is done, based on detecting that the introduced flow rate of the hydrate slurry into the latent-heat heat exchanger reduces. Similarly, it is also judged whether or not the hydrate slurry adheres to the heat transfer surface of the latent-heat heat exchanger. The judgement is based on the increased amount of the pressure losses, and based on the decreased amount that is the temperature difference between the inlet and the outlet of the cold water or the hydrate slurry, which is supplied to the latent-heat heat exchanger.

Hereinafter, it is explained how to operate the melting operation. Supplying the cold water to one latent-heat heat exchanger 3a stops. On the contrary, and supplying the cold water to the other latent-heat heat exchanger 3b starts. By switching over the usable heat exchanger from the latent-heat heat exchanger 3a to the latent-heat heat exchanger 3b in this manner, hydrate slurry continued to be generated continuously. To the latent-heat heat exchanger 3a, which is not supplied with the cold water, the hot water is supplied from a hot water tank 7 in order to melt the adhered hydrate slurry to the heat transfer surface in the heat exchanger. Although the hot water for melting, which is warmed by a heater in the hot water tank 7, is used in FIG. 1, water on the downstream side of the latent-heat heat exchanger may be usable for the melting operation.

In the above mentioned description, in case that the flow rate of the hydrate slurry to the latent-heat heat exchanger decreases, in case that the exchanged heating value decreases, or in case that the pressure losses increases, the melting operation is done. Contrarily, if the melting operation is performed by successively switching over a plurality of latent-heat heat exchangers at the fixed time interval, detection instruments such as a flowmeter pressure gage, and thermometer is eliminated. The elimination enables the system to be simplified.

As mentioned above, the heat exchanger for generating the hydrate slurry is separated into the two sorts of the heat exchanger. One is a sensible-heat heat exchanger for supercooling aqueous solution in a liquid state. And the other is a latent-heat heat exchanger for cooling hydrate slurry. And providing a plurality of switchable latent-heat heat exchangers surely makes it possible to prevent the latent-heat heat exchanger from blocking in the device. And then, hydrate slurry can be generated continuously with high efficiency.

Next, in the exemplary embodiment, the result is obtained by studying the proper conditions for the degree of supercooling the aqueous solution by the sensible-heat heat exchanger 2. Furthermore, the result is obtained, which is the injection rate of the hydrate slurry injected into the aqueous solution in order to cancel the supercooling of the aqueous solution.

Figure 2:
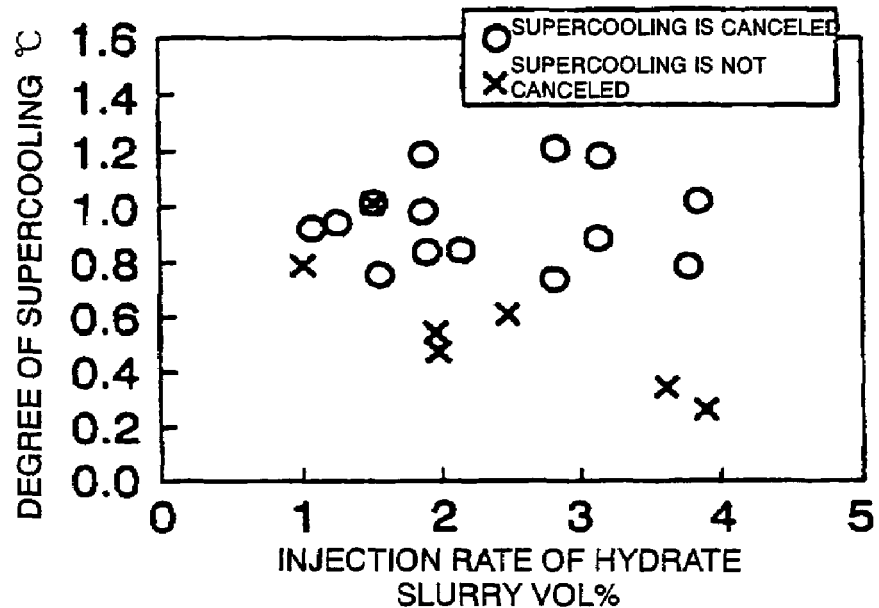
FIG. 2 is a chart showing the presence and absence of canceling the supercooling under conditions of the injection rate of hydrate slurry and the degree of supercooling of aqueous solution, as one example of the present invention.

In FIG. 2, the abscissa represents the injection rate of the hydrate slurry (volume ratio of the hydrate slurry to the total quantity of the aqueous solution). The ordinate represents the degree of supercooling the aqueous solution for various concentrations of the guest compound in the aqueous solution. The conditions, in which supercooling was canceled, is indicated by ○. And the conditions, in which supercooling was not canceled, is indicated by X. Whether or not canceling the supercooling is present (absent or not) is judged from the viewpoint of whether or not a rising temperature is detected due to canceling the supercooling by using the thermometers provided on the upstream and downstream sides of the injection portion of the hydrate slurry.

As seen from FIG. 2, if the degree of supercooling the aqueous solution is equal or higher than 0.7° C. or if the injection rate of the hydrate slurry is the equal or higher than 1 vol % of the flow rate of the aqueous solution, it is almost enough to cancel the supercooling of the aqueous solution. Furthermore, if the injection rate of the hydrate slurry is the equal or higher than 1.8 vol % of the flow rate of the aqueous solution, supercooling the aqueous solution is, surely, canceled. Thus, a small quantity of the injected hydrate slurry suffices for canceling the supercooling of the aqueous solution. And most of the remaining hydrate slurry is used for the load for air conditioner 6.

Figure 3:
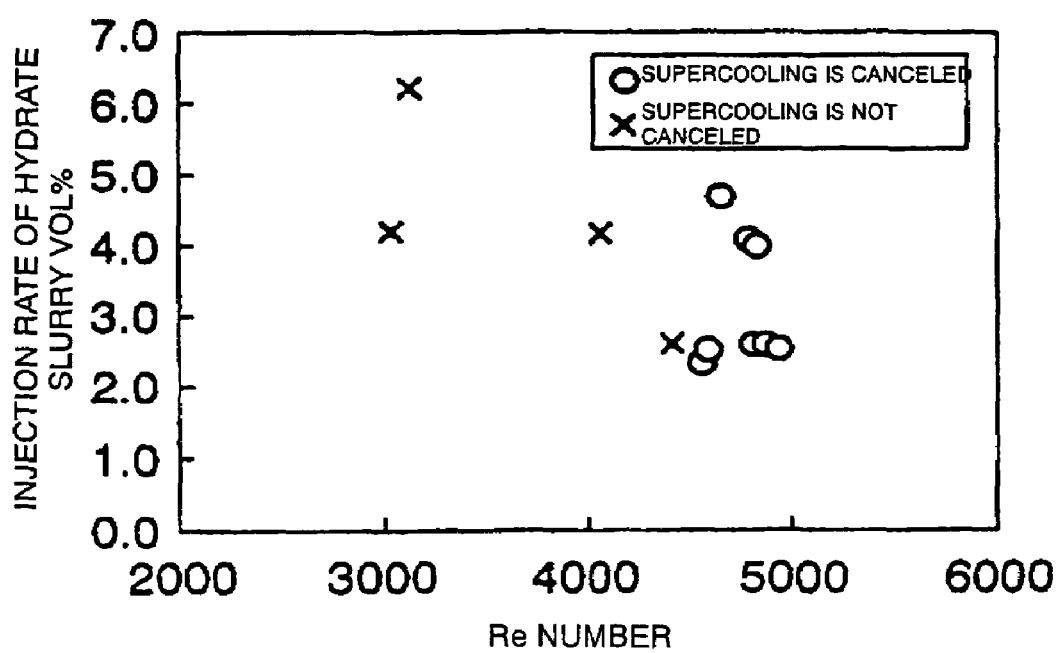
FIG. 3 is a chart showing the presence and absence of canceling the supercooling under conditions of the Re number of aqueous solution and the injection rate of hydrate slurry, as one example of the present invention.

And, furthermore, the result resulting from studying is described below, that is, the conditions in which supercooling the aqueous solution is canceled regarding the Reynolds (Re) number of the aqueous solution. The Re number is determined to be $Re = D \cdot U \cdot \rho / \eta$, using pipe diameter (D), flow velocity of aqueous solution (U), density ($\rho$), and coefficient of viscosity ($\eta$). In FIG. 3, the abscissa represents Re number, and the ordinate represents injection rate of the hydrate slurry. The condition in which supercooling was canceled is indicated by ○, and the condition in which supercooling was not canceled is indicated by X. This experiment was conducted at the degree of supercooling the aqueous solution about 0.8° C. and at the injection rate of the hydrate slurry that is the equal or higher than 2 vol %.

Looking at FIG. 3, it is found that when the Reynolds number of the aqueous solution is the equal or larger than 4500, the hydrate slurry is injected into the system and supercooling the aqueous solution is, surely, canceled. As a result, the hydrate slurry can be generated efficiently and stably.

Next, an apparatus for generating hydrate slurry in accordance with another example of the present invention is described below.

Figure 4:
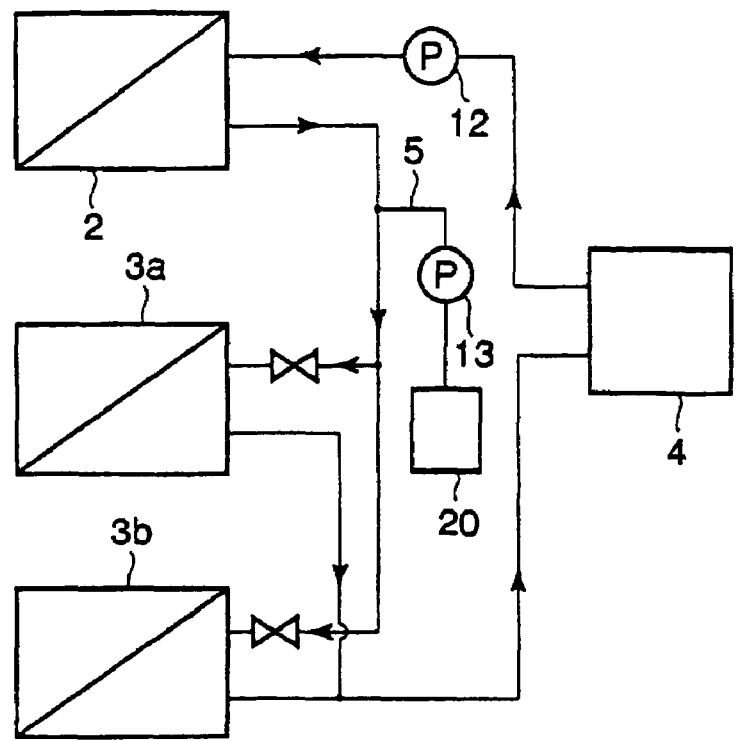
FIG. 4 is a schematic drawing of an apparatus for generating hydrate slurry, which has a small type heat exchanger for injecting hydrate slurry, as another example of the present invention.

In FIG. 1, the injection pipe 5 is connected to the pipe between the sensible-heat heat exchanger 2 and the latent-heat heat exchangers 3a and 3b from the pipe on the downstream side of the latent-heat heat exchangers 3a and 3b. From such injection pipe, the part of the hydrate slurry generated by the latent-heat heat exchanger is injected into the aqueous solution in a supercooled state. Instead, as shown in FIG. 4, a small size of the heat exchanger for generating the hydrate slurry 20 may be provided separately to beforehand prepare the hydrate slurry to be injected. FIG. 4 shows a portion of the apparatus for generating the hydrate slurry, which includes the sensible-heat heat exchanger 2, the latent-heat heat exchangers 3a and 3b, the thermal storage tank 4, the heat exchanger for generating the hydrate slurry 20 provided on the injection pipe 5, and pipes for connecting these elements each other. As the heat exchanger for generating the hydrate slurry 20, a small size plate type heat exchanger, an enclosed tank jacket type heat exchanger, or the like are used. If the hydrate slurry generating heat exchanger 20 is provided in this manner, the system can start quickly. Also, a buffer tank may be added to the hydrate slurry generating heat exchanger 20, according to the necessity, to beforehand prepare the hydrate slurry that is required at the starting time. Furthermore, in the air-conditioning system provided with the thermal storage tank 4 as shown in FIG. 1, the hydrate slurry in the thermal storage tank 4 may be used.

Figure 5:
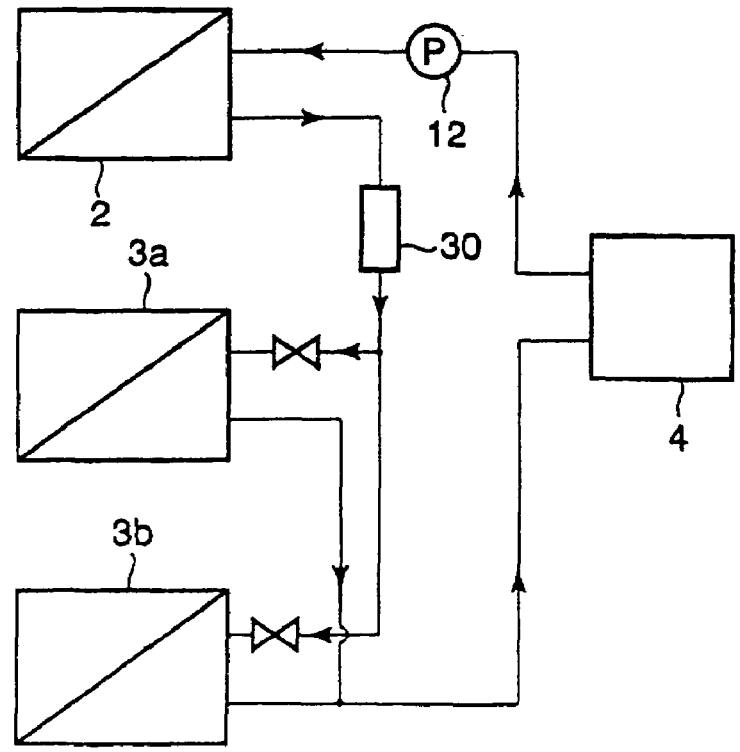
FIG. 5 is a schematic drawing of an apparatus for generating hydrate slurry, provided with means for canceling the supercooling, as another example of the present invention.

As mentioned above, the apparatus for generating the hydrate slurry is used for injecting the hydrate slurry on the downstream side of the sensible-heat heat exchanger 2 to cancel the supercooling of the aqueous solution. Instead, as shown in FIG. 5, means for canceling supercooling 30 may be provided in the pipe between the sensible-heat heat exchanger 2 and the latent-heat heat exchangers 3a and 3b. FIG. 5 shows only a portion of the hydrate slurry generating apparatus including the sensible-heat heat exchanger 2, the latent-heat heat exchangers 3a and 3b, the thermal storage tank 4, pipes for connecting these elements each other, and the means for canceling supercooling 30.

Examples of the means for canceling supercooling 30 are shown with reference to FIGS. 6 to 10.

Figure 6:
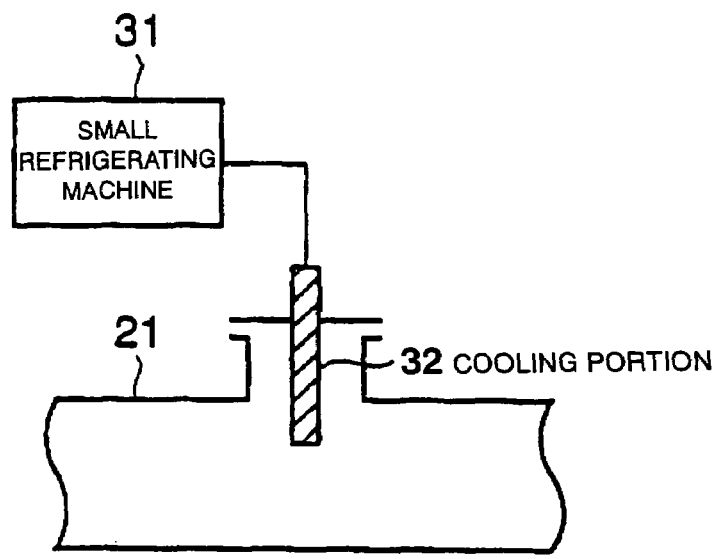
FIG. 6 is a schematic drawing showing one example of means for canceling the supercooling, in accordance with the present invention.

The means for canceling supercooling shown in FIG. 6 consists of a cooling portion 32 connected to a small refrigerating machine 31, and the cooling portion 32 is inserted in a pipe 21 from the outside. As shown in FIG. 6, the cooling portion 32 provided in the pipe 21 is cooled to degree of the equal or lower than the temperature for generating the hydrate by the small refrigerating machine 31, and thus the hydrate adheres to the surface. When the aqueous solution, which has been supercooled by the sensible-heat heat exchanger 2, gets in contact with the cooling portion 32, the hydrate adhering to the surface of the cooling portion 32 activates as a product nucleus.

Therefore, supercooling is canceled and then, it becomes easy to generate the hydrate.

As the means for canceling supercooling, a low-temperature protrusion having a Peltier element may be inserted in the pipe 21. Such a low-temperature protrusion is, like the cooling portion of the small refrigerating machine shown in FIG. 6, also cooled to degree of the temperature, which is the equal or lower than the temperature of generating the hydrate in advance, and thus a hydrate is kept to be adhered to the surface. When the aqueous solution having been supercooled gets in contact with the low-temperature protrusion, the hydrate adhering to the surface of the low-temperature protrusion acts as a product nucleus, so that supercooling is canceled and it becomes easy to generate the hydrate.

Figure 7:
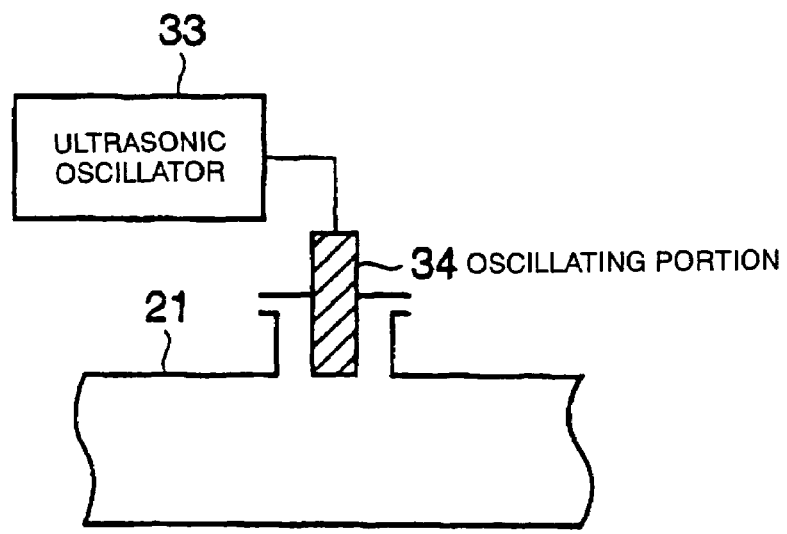
FIG. 7 is a schematic drawing showing another example of means for canceling the supercooling, in accordance with the present invention.

The means for canceling supercooling shown in FIG. 7 have a oscillating portion 34 connected to an ultrasonic oscillator 33, and the oscillating portion 34 is inserted in the pipe 21 from the outside. When the aqueous solution having been supercooled by the sensible-heat heat exchanger 2 gets in contact with the oscillating portion 34, supercooling is canceled by the oscillation, and thus it becomes easy to generate a hydrate.

Also, instead of ultrasonic waves, oscillation with a low frequency of several hertz to several hundred hertz may be used.

Figure 8:
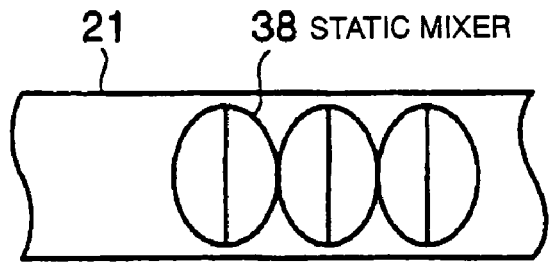
FIG. 8 is a schematic drawing showing another example of means for canceling the supercooling, in accordance with the present invention.

The means for canceling supercooling shown in FIG. 8 have a static mixer 38 having a mechanism such as a twisted plate for reversing and mixing a fluid, which is provided in the pipe 21. The static mixer 38 stirs the supercooled aqueous solution, so that the supercooling is canceled and it becomes easy to generate a hydrate.

Figure 9:
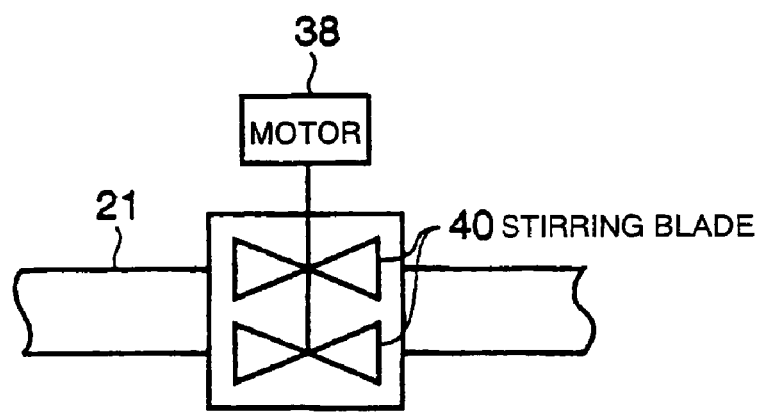
FIG. 9 is a schematic drawing showing another example of means for canceling the supercooling, in accordance with the present invention.

The means for canceling supercooling shown in FIG. 9 have a mixing blade which is housed in a vessel inserted in an intermediate portion of the pipe 21 and is rotated by a motor 39. The mixing blade 40 stirs the supercooled aqueous solution, so that supercooling is canceled and it becomes easy to generate a hydrate.

Figure 10:
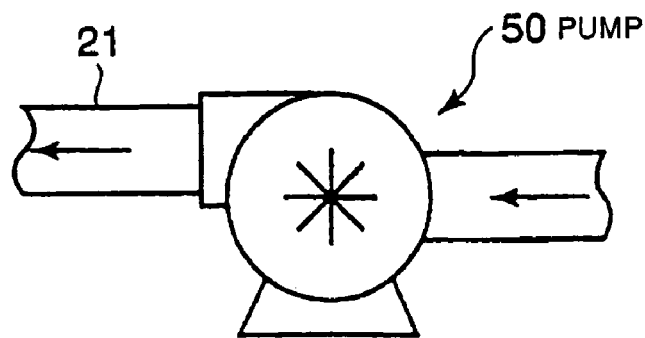
FIG. 10 is a schematic drawing showing another example of means for canceling the supercooling, in accordance with the present invention.

The means for canceling supercooling shown in FIG. 10 have a pump 50, in which an impeller is rotated in a pump casing provided in an intermediate portion of the pipe 21. The pump 50 stirs the supercooled aqueous solution, so that supercooling is canceled and it becomes easy to generate a hydrate.

The configuration may be such that a bypass pipe is provided on the pipe 21 between the sensible-heat heat exchanger 2 and the latent-heat heat exchangers 3a and 3b. And the means for canceling supercooling as shown in FIGS. 6 to 10 is provided in this bypass pipe. Also, the number of means for canceling supercooling is not limited to one, and the means for canceling supercooling may be provided at a plurality of location. Further, a plurality of means for canceling supercooling a different type may be combined to be used.

As described above, according to the present invention, a system is provided for generating the hydrate slurry efficiently. In the heat exchanger of the system, supercooling is cancelled, and then, such canceling prevents the hydrate from generating rapidly. Therefore, it brings up no adhered hydrate to the heat transfer surface in the heat exchanger.

Consequently, the exemplary embodiment makes it possible to minimize the heat transfer area of the heat exchanger. And the exemplary embodiment makes it possible to increase the flow velocity of the hydrate slurry, without decreasing the performance of the heat transfer. As a result, the exemplary embodiment invites the apparatus for generating the hydrate slurry and the method for generating the hydrate slurry in the optimized way.

Embodiment 2

In the exemplary embodiment of the apparatus for generating the hydrate slurry in accordance with the present invention, a circulation system for the aqueous solution of the guest compound is located in an evaporator of a refrigerating machine, in order to cool the aqueous solution of the guest compound. In the exemplary embodiment, a heat exchanger for generating the hydrate slurry is not required, compared with in a conventional system. So, the exemplary embodiment enables the system to be simplified. Furthermore, a plurality of evaporators is provided so as to be switchable. And when blocking begins in the process of circulating the aqueous solution of the guest compound in one evaporator, it stops cooling the aqueous solution of the guest compound in the evaporator. On the contrary, another evaporator starts cooling the aqueous solution of the guest compound. In such a way, since the circulation system for the aqueous solution of the guest compound, which has entered into the blocking stage, is not used. Therefore, it is not required to increase the pump power for transporting the aqueous solution of the guest compound.

Furthermore, a high-temperature refrigerant in the refrigerating machine is supplied to the evaporator. At that time, in the evaporator, it has already stopped cooling the aqueous solution of the guest compound. In the circulating process, the operation for melting the hydrate, which has entered into the blocking stage, is done by utilizing the heat inside the refrigerating machine. As a result, it becomes obtainable to save the energy.

Furthermore, in the apparatus for generating the hydrate slurry in accordance with the exemplary embodiment, the means for detecting that the circulation system located in the evaporator have entered into the blocking stage. The above-mentioned means make it possible to stop generating the hydrate slurry in one evaporator. On the contrary, the means make it possible to start generating the hydrate slurry in another evaporator. In this case, the mutual evaporators are switched over automatically and quickly.

Further, in the apparatus for generating the hydrate slurry in accordance with the exemplary embodiment, the aqueous solution of the guest compound is supercooled in the circulation system located in the evaporator. And means for canceling the supercooled state of the aqueous solution and for generating the hydrate slurry is provided in the outlet pipe of the circulation system for the aqueous solution of the guest compound from the evaporator. The means enable the hydrate slurry in the circulation system located in the evaporator to generate. The generated amount is to the least extent.

The exemplary embodiment can prevent the hydrate form blocking in the circulation system, and the pump power from increasing.

EXAMPLE

The following is one description of one example of the exemplary embodiment.

Figure 11:
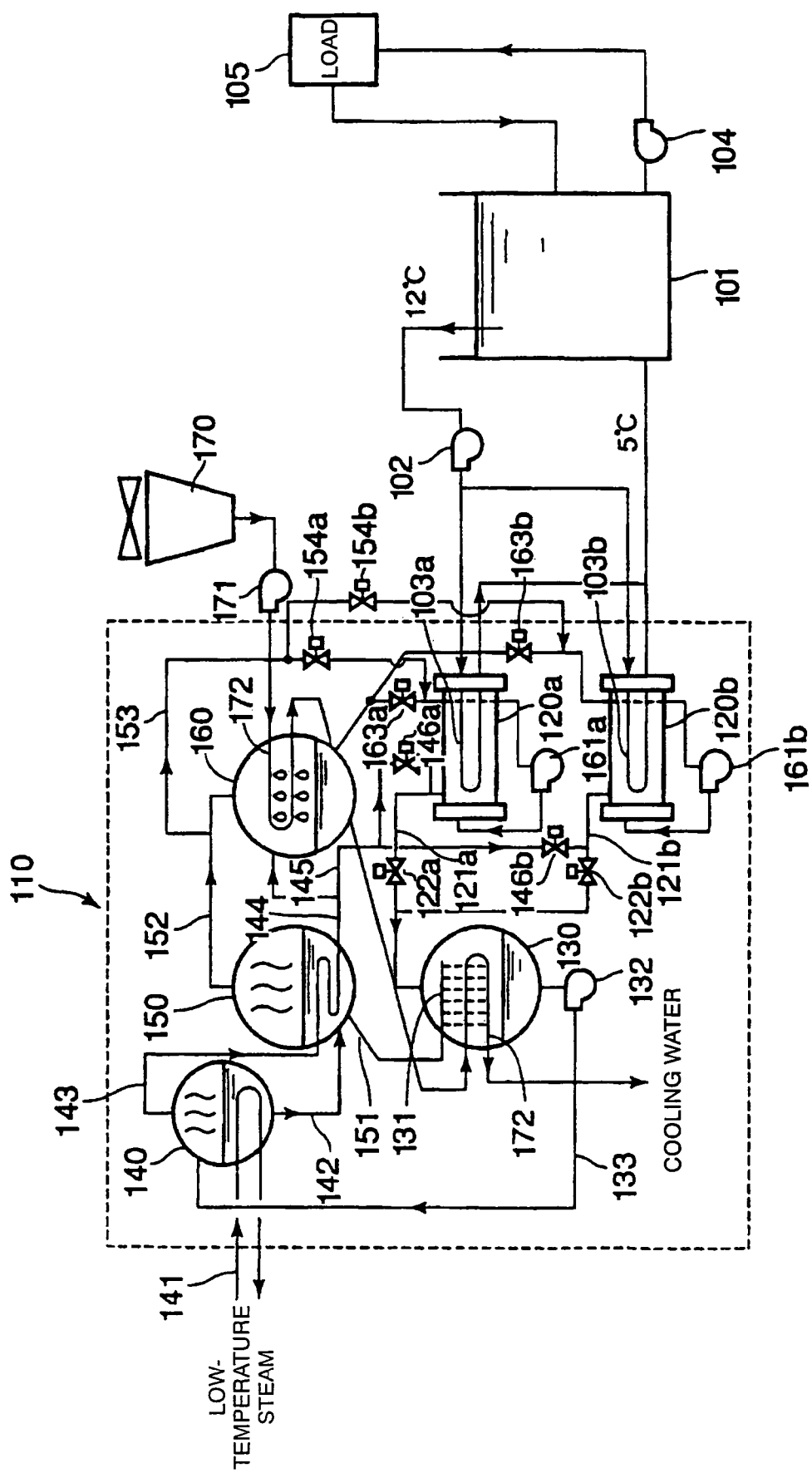
FIG. 11 is a schematic drawing showing one example of an apparatus for generating hydrate slurry, in accordance with the present invention.

FIG. 11 shows one example of the apparatus for generating the hydrate slurry, in accordance with the exemplary embodiment. The apparatus for generating the hydrate slurry uses a double effect an absorption refrigerating machine 110, which has a double effects, and which uses water as a refrigerant and lithium bromide (LiBr) as an absorbent. The essential components of such a absorption refrigerating machine are two evaporators 120a and 120b, which are also used as a heat exchangers for generating hydrate slurry, an absorber 130, a first generator 140, a second generator 150, and a condenser 160. Furthermore, a cooling tower 170 is provided for supplying cooling water, which is used in the condenser 160 and the like.

Aqueous solution of the guest compound in a thermal storage tank 101 is transported into a heating tube located in the evaporator by an aqueous solution pump 102. And the aqueous solution is supercooled. That is to say, the aqueous solution possesses the lower temperature than the generating temperature of the hydrate, but the aqueous solution remains in a liquid state. As described later, the aqueous solution, which has been supercooled in the evaporator, are canceled to be supercooled by means for canceling supercooling (not shown in FIG. 11). And then, the aqueous solution becomes hydrate slurry, and returns back to the thermal storage tank 101. At this time, a first hydrate and a second hydrate with a different hydration number respectively (the temperature generating the second hydrate is higher than that of the first hydrate) exist, may be in a case, the existence is influenced by the concentration the aqueous solution of the guest compound. In such a concentration area, canceling the supercooling generates the second hydrate. As described later, there is a circulation system for the aqueous solution of the guest compound. In such a circulation system, the aqueous solution returns back to the thermal storage tank 101 through the heating tube located in the evaporator from the thermal storage tank 101. Means for detecting whether or not the inside of the heating tube has entered into the blocking stage by the adhered hydrate slurry is provided in the stage. (not shown in FIG. 1). The hydrate slurry in the thermal storage tank 101 is transported into a load 105 by using a slurry pump 104. In the load 105, the cold heat of the hydrate slurry is utilized, and the hydrate slurry turns to the aqueous solution and returns back to the thermal storage tank 101.

In the exemplary embodiment, there is one case where an operation for generating the hydrate slurry is done, using the evaporator 120a.

The aqueous solution of the guest compound in the thermal storage tank 101 flows in a heating tube 103a located in the evaporator 120a, by using the aqueous solution pump 102. The water, which is condensed by the condenser 160, is transported into the evaporator 120a through a pipe 162 by using a pump 161a. And the water is sprayed onto the evaporator 120a and the water evaporates on the surface of the heating tube 103a. As a result, the aqueous solution of the guest compound, which flows into the heating tube 103a, is cooled. Steam, which is evaporated in the evaporator 120a, is sent into the absorber 130 through a pipe 121a.

In the absorber 130, solution, which has the concentrated value of LiBr and which is supplied from the second generator 150, is sprayed out from a nozzle 131. In the absorber 130, a cooling water pipe 172 is located, which runs from the cooling tower 170 through the condenser 160. Cooling water in the cooling tower 170 is transported into the cooling water pipe 172, by using a cooling water pump 171. Solution, which has the concentrated value of LiBr and which is sprayed into the absorber 130, is cooled by the cooling water that flows in the cooling water pipe 172. And the absorbing performance of the steam (vaporized water) is promoted to be a high degree. The vaporized water from the evaporator 120a is absorbed by solution, which has the concentrated value of LiBr. The solution concentrating LiBr and the solution diluting LiBr gather at the bottom of the absorber 130. The solution diluting LiBr at the bottom of the absorber 130 is transported into the first generator 140 through a pipe 133 by using an absorbed solution pump 132.

A heating tube 141 is provided in the first generator 140. And low temperature steam is fed into the heating tube 141. The low temperature steam is generated by a heat source possessing relatively low temperature, such as exhaust heat from the factory. The low-temperature steam, which is supplied to the heating tube 141, heats the solution diluting LiBr, which is fed from the absorber 130. And, the water is evaporated to dilute the solution concentrating LiBr. The solution diluting LiBr is fed into the second generator 150 through a pipe 142. Furthermore, the vaporized water generated in the first generator 140 passes through the solution concentrating LiBr in the second generator 150 through a pipe 143. And the vaporized water is further fed into the condenser 160 through a pipe 144.

In the solution concentrating LiBr in the second generator 150, the pipe 143 is located. The vaporized water generated in the first generator 140 flows in the pipe. The vaporized water enables the solution concentrating LiBr, which flows in the pipe 143, to be heat. And water is evaporated, resulting in further concentrating the concentrated solution of LiBr. The concentrated solution of LiBr, which has been concentrated at the two separate stages in the above-mentioned manner, restore the absorbing performance of the vaporized water. And then, the solution is supplied to the nozzle 131 in the absorber 130, and is used for absorbing the vaporized water from the evaporator 120a. Furthermore, the vaporized water generated in the second generator 150 is fed into the condenser 160 through a pipe 152.

The cooling water pipe 172 is located in the condenser 160, so that the cooling water from the cooling tower 170 may flow. The cooling water, which flows in the cooling water pipe 172, enables the vaporized water generated in the first generator 140 and in the second generator 150 to condense. The condensed water in the condenser 160 is fed to the generator 120a.

Such a refrigerating cycle makes it possible to supercool the aqueous solution of the guest compound, which has possessed about 12° C. and which has been supplied from the thermal storage tank 101. And then, supercooling is canceled outside the evaporator 120a, resulting in generating the hydrate slurry. The generated hydrate slurry of about 5° C. in this manner returns back to the thermal storage tank 101. The means for canceling supercooling will be described later.

However, when the above-described hydrate slurry is generated in the operation, the hydrate adheres to the inside of the heating tube 103a located in the evaporator 120a, and blocking sometimes begins in the heating tube 103a.

When a sign, which means whether or not blocking happens, is detected in the heating tube 103a located in the evaporator 120a, the operation generating the hydrate slurry in the evaporator 120a stops. Afterwards, one evaporator is switched over to another evaporator 120b to continue the operation generating the hydrate slurry.

In the exemplary embodiment, solenoid-operated valves 163a and 122a are closed. It stops transporting the condensed water from the condenser 160 to the evaporator 120a, and it stops transporting the vaporized water from the evaporator 120a to the absorber 130. And then, solenoid-operated valves 163b and 122b open. Transporting starts, which is the condensed water from the condenser 160 to the evaporator 120b. Thus, the operation generating the hydrate slurry continues by using the evaporator 120b.

On the other hand, the evaporator 120a enters into the stage of the melting operation, in which the operation generating the hydrate slurry has stopped. For the melting operation, either the steam generated in the second generator 150 or the condensed water at the outlet of the second generator 150 is used for a heat source for melting.

Hereinafter, one case is described that using the steam generated in the second generator 150 as a heat source for melting performs the melting operation. In such a case, a bypass pipe 153 provided with a solenoid-operated valve is attached to the steam pipe 152. The steam pipe is located between the second generator 150 and the condenser 160. Here, some of the vaporized water generated in the second generator 150 is transported to the evaporator 120a in order to melt the adhered hydrate to the inside of the heating tube 103a. That is to say, detecting a blocking sign in the heating tube 103a, the solenoid-operated valves 163a and 122a are closed, as described above. Keeping on such state, a solenoid-operated valve 154a in the bypass pipe 153 opens, in order to transport part of the vaporized water generated in the second generator 150 into the evaporator 120a.

It may be a case that the melting operation is performed, using the condensed water at the outlet of the second generator 150 as a heat source for melting. In such a case, a bypass pipe 145 provided with a solenoid-operated valve is attached to the pipe 144 for condensed water between the second generator 150 and the condenser 160. In such a way, part of the condensed water at the outlet of the second generator 150 is transported to the evaporator 120a in order to melt the adhered hydrate into the inside of the heating tube 103a. That is to say, detecting a blocking sign in the heating tube 103a, the solenoid-operated valves 163a and 122a are closed as described above. Keeping on such state, a solenoid-operated valve 146a in the bypass pipe 145 opens for transporting part of condensed water at the outlet of the second generator 150 into the evaporator 120a. The above-described melting operation enables the evaporator 120a to be ready and usable for the operation generating the hydrate slurry again.

Not only in the above-mentioned case but in case that a blocking sign is detected in the heating tube 103b located in the evaporator 120b, the operation, which generates the hydrate slurry in the evaporator 120b, stops. And switching over the evaporator to the evaporator 120a, the operation generating the hydrate slurry continues.

Figure 12:
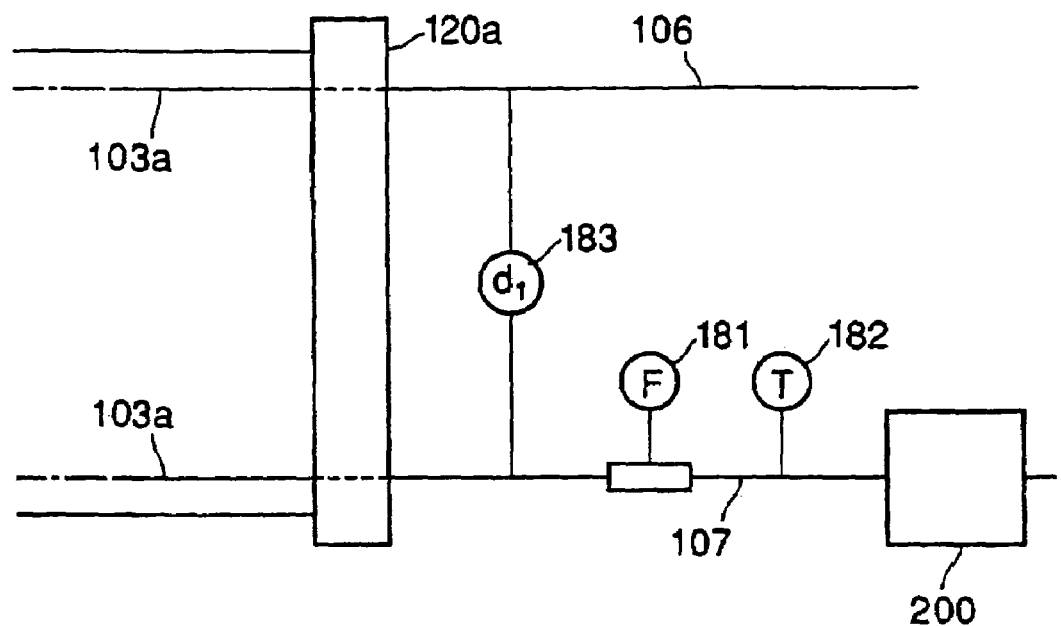
FIG. 12 is a schematic drawing showing means for detecting blocking and means for preventing the apparatus from blocking.

Furthermore, the means for detecting blocking in the heating tube located in the evaporator and means for preventing detecting are explained with reference to FIG. 12. In FIG. 12, the evaporator 120a is described merely. But, the evaporator 120b has the same configuration as the evaporator 120a.

As shown in FIG. 12, a flowmeter 181 and a thermometer 182 are installed on an outlet pipe 107 running from the heating tube 103a. Also, a differential pressure gage 183 is connected across an inlet pipe 106 running to the heating tube 103a and the outlet pipe 107 running from the heating tube 103a. Such devices are used for detecting whether or not the temperature of the aqueous solution is different from the determined one, whether or not the flow rate of the aqueous solution is different from the determined one. Otherwise, the devices are used for detecting whether or not the differential pressure of aqueous solution between the inlet and the outlet is different from the determined one. The device enables the heating tube 3a to be detected whether or not the hydrate blocking procedure has begun. Means for canceling supercooling 200 is, also, provided on the outlet pipe 107 on the downstream side of such devices.

When the flow-meter 181, the thermometer 182, or the differential pressure gage 183 indicates that the heating tube 103a has entered into the blocking stage, the detection signal is sent to the solenoid-operated valves as described above. Such an input signal into the solenoid-operated valves enables the evaporator 120a to enter into the melting operation.

Furthermore, the signal of the flowmeter 181, the thermometer 182, or the differential pressure gage 183 can be used for controlling the refrigerating performance of the refrigerating machine so as to supercool the aqueous solution of the guest compound.

Figure 13:
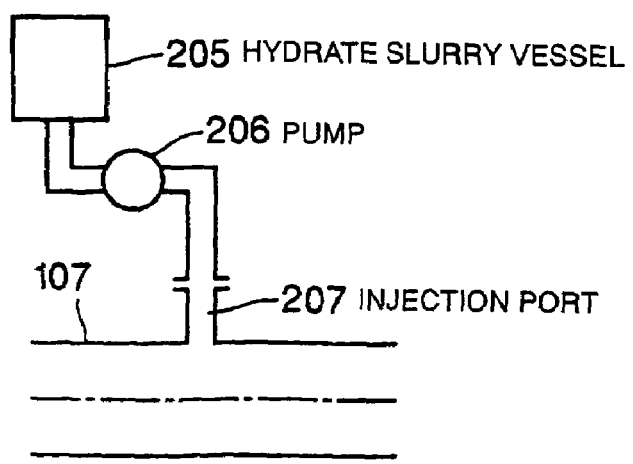
FIG. 13 is a schematic drawing showing one example of means for canceling the supercooling.

The means for canceling supercooling shown in FIG. 13 has an injection port 207 for injecting hydrate from hydrate slurry vessel 205 into the outlet pipe 107 via a pump 206. When the supercooled aqueous solution gets into contact with the hydrate injected through the injection port 207, the injected hydrate makes it possible easily to generate the hydrate, simultaneously with the generated hydrate as nucleus.

Figure 14:
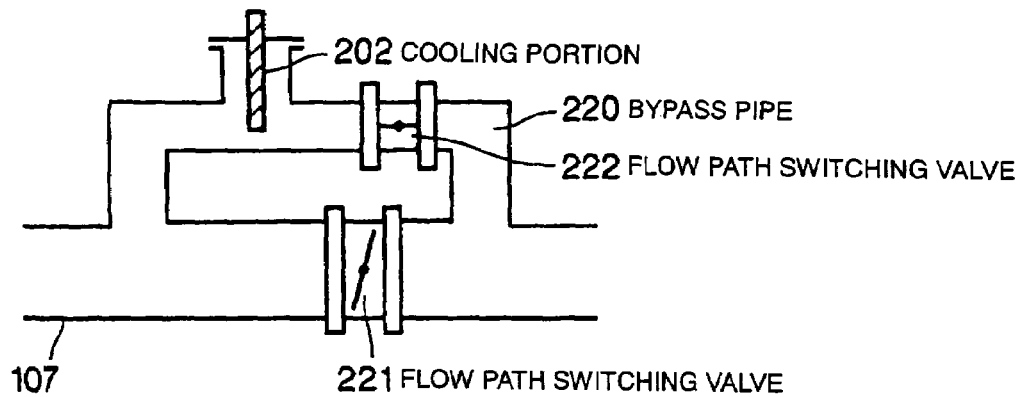
FIG. 14 is a schematic drawing showing another example of means for canceling the supercooling.

As shown in FIG. 14, the configuration may be a case such that a bypass pipe 220 is located onto the outlet pipe 107, flow path switching valves 221 and 222 are located onto the outlet pipe 107 and the bypass pipe 230, respectively. And the means for canceling supercooling such as a cooling portion 202 of a small refrigerating machine is located in the bypass pipe 230.

Figure 15:
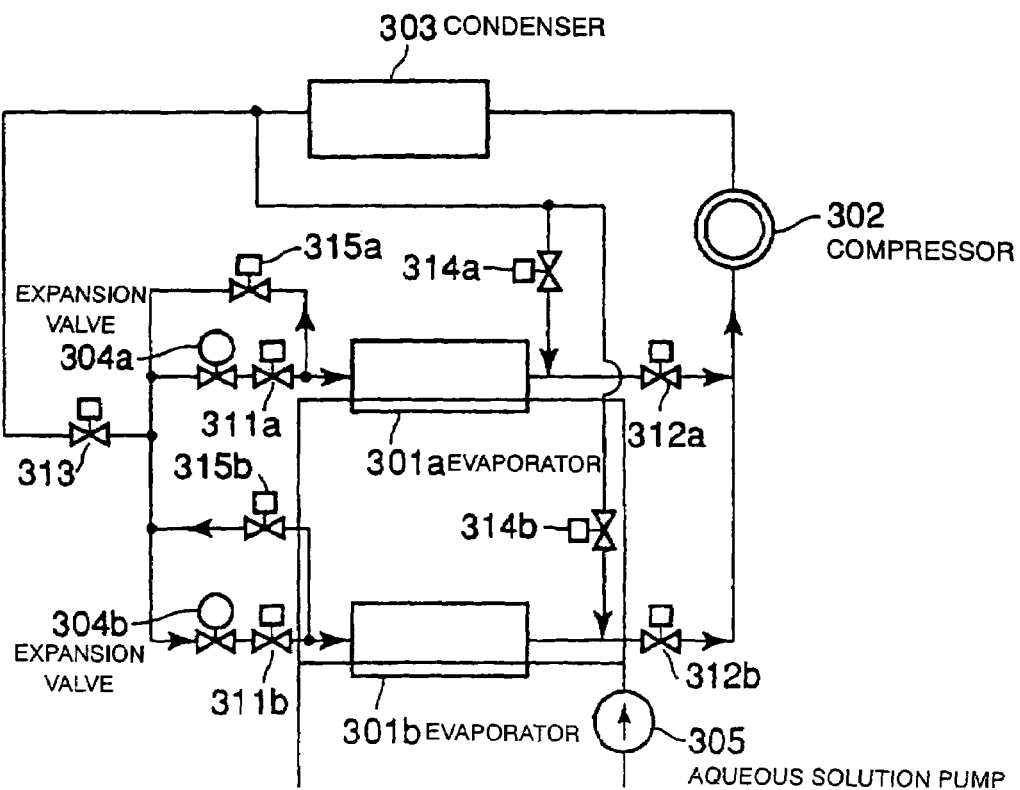
FIG. 15 is a schematic drawing showing another example of an apparatus for generating hydrate slurry, in accordance with the present invention.
Figure 16:
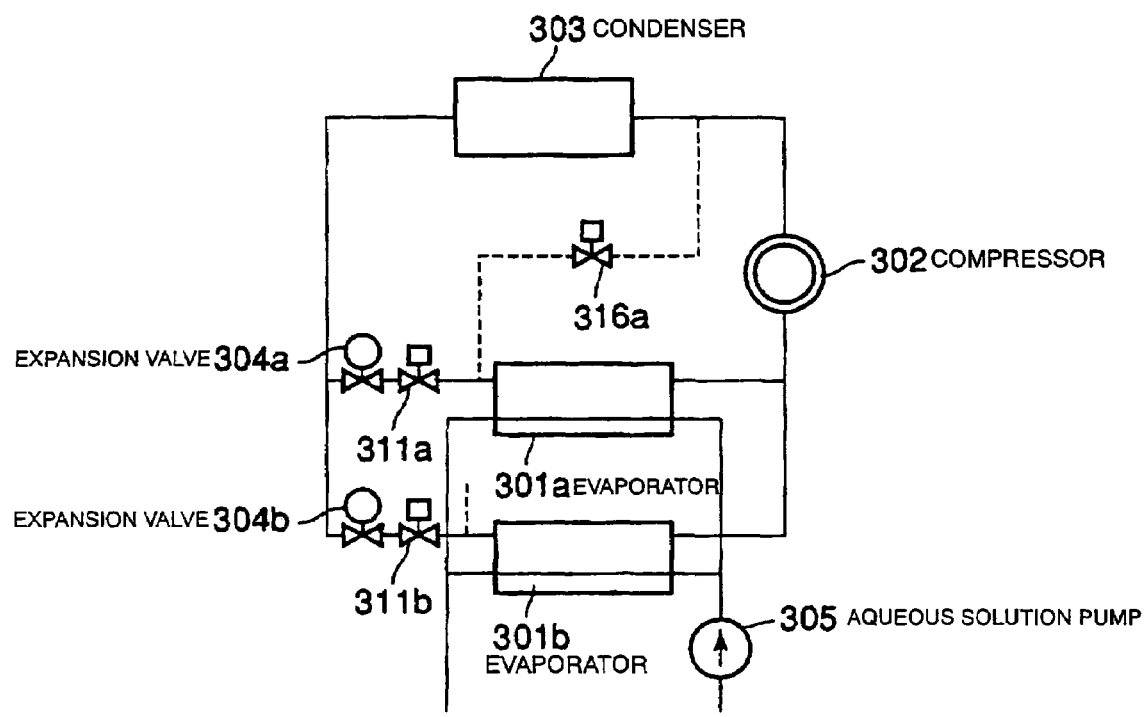
FIG. 16 is a schematic drawing showing another example of an apparatus for generating hydrate slurry, in accordance with the present invention.

With reference to FIGS. 15 and 16, the apparatus for generating the hydrate slurry are described in accordance with other examples of the exemplary embodiment. The apparatus for generating the hydrate slurry uses a compression-refrigerating machine, which has two switchable evaporators. First, the configuration, which is common to FIG. 15 and FIG. 16, is explained. And then the different configuration between FIG. 15 and FIG. 16 is explained.

In FIGS. 15 and 16, the essential components of the compression refrigerating machine are two evaporators 301a and 301b, which are also used as heat exchangers for generating hydrate slurry, a compressor 302, a condenser 303, and expansion valves 304a and 304b corresponding the evaporators. The evaporators 301a and 301b shown in FIGS. 15 and 16 are shell-and-tube type heat exchangers or plate type heat exchangers, where exchanging the heat is done via a heat transfer surface. In of case the shell-and-tube type heat generator, the aqueous solution of the guest compound flows on the tube (heating tube) side. And a refrigerant flows on the shell side. The aqueous solution of the guest compound circulates in a circulation system, where the aqueous solution of the guest compound, is transported from a thermal storage tank (not shown) to the heating tube located in the evaporator via an aqueous solution pump 305. And the aqueous solution is supercooled. And then, canceling supercooling to form hydrate slurry, the aqueous solution returns back into the thermal storage tank. Although not shown in the above-mentioned Figs., detecting means, means for canceling supercooling, and the like are also provided as the same as FIG. 11.

The apparatus for generating the hydrate slurry shown in FIG. 15 performs the operation, using the evaporator 301a. That is, the apparatus cools the aqueous solution of the guest compound that flows in a heating tube located in the evaporator 301a. At this stage, a solenoid-operated valve 313 and solenoid-operated valves 311a and 312a on the upstream and downstream sides of the evaporator 301a opens, and solenoid-operated valves 311b and 312b on the upstream and downstream sides of the evaporator 301b are closed.

When the heating tube in the evaporator 301a enters into the blocking procedure, the solenoid-operated valves 311a and 312a on the upstream and downstream sides of the evaporator 301a are closed, and the solenoid-operated valves 311b and 312b on the upstream and downstream sides of the evaporator 301b open. Using the evaporator 301b makes it possible to continue to operate generating the hydrate slurry. On the other hand, keeping solenoid-operated valves 314a and 315a open, a high-temperature and high-pressure refrigerant liquid at the outlet of the condenser 303 flows into the evaporator 301a, by way of bypassing. In such a way, melting operation is done (the condensed refrigerant liquid passes by way of the bypass line). The refrigerant liquid, whose temperature has decreased by the melting operation, is sent to the other evaporator 301b. There may be a contrary case that the heating tube in the evaporator 301b enters into the blocking procedure. In this case, the same operation is the same as described above.

In FIG. 16, there may be a case that for generating the hydrate slurry performs the operation using the evaporator 301a. That is, the apparatus cools the aqueous solution of the guest compound. In the procedure, the aqueous solution flows in the heating tube located in the evaporator 301a. When the heating tube in the evaporator 301a enters into the blocking procedure, the solenoid-operated valve 311a is closed, and a solenoid-operated valve 316a opens. Thus, a high-temperature and high-pressure refrigerant gas at the outlet of the compressor 302 flows by way of the bypassing line. And then melting operation is performed (the condensed refrigerant gas passes by way of the bypass line).

Although not shown in FIG. 16, for the evaporator 301b as well, a bypass pipe and a solenoid-operated valve corresponding to the bypass pipe and the solenoid-operated valve 316a for the evaporator 301a are provided. When the heating tube in the evaporator 301b enters into the blocking procedure, the same operation as described above is performed.

The apparatus for generating the hydrate slurry shown in FIG. 15 and FIG. 16 also achieve the same effects as those of the system shown in FIG. 11.

As described above in detail, according to the present invention, the apparatus for generating the hydrate slurry makes it possible to obtain the cost reduction and energy saving, resulting from deleting a plate type or a multitubular type heat exchanger and a pump.

What is claimed is:

1. An apparatus for generating a hydrate slurry, wherein the hydrate slurry is a mixture of an aqueous solution containing a guest compound and a hydrate of the guest compound, the hydrate being generated by cooling the aqueous solution at a temperature of more than 0° C., the apparatus comprising a first heat exchanger, at least one second heat exchanger and a canceling device, the first heat exchanger being configured for supercooling the aqueous solution to generate a supercooled aqueous solution, while holding the aqueous solution in a liquid state, the canceling device being provided on the downstream side of the first heat exchanger, the canceling device being configured to cancel the supercooling of the aqueous solution, and the at least one second heat exchanger being provided on the downstream side of the first heat exchanger, the at least one second heat exchanger being configured to cool the hydrate slurry generated from the aqueous solution, the supercooling of which is canceled by the canceling device.

2. The apparatus according to claim 1, wherein the at least one second heat exchanger comprises a plurality of second heat exchangers which are switchable.

3. The apparatus according to claim 2, wherein when adhesion of the hydrate is detected in a second heat exchanger of the plurality of the second heat exchangers in which the hydrate slurry is generated, the generation of the hydrate slurry is stopped in said second heat exchanger, the adhered hydrate is melted therein, and the hydrate slurry is generated in another second heat exchanger of the plurality of the second heat exchangers.

4. The apparatus according to claim 2, wherein the plurality of the second heat exchangers are switched over successively at a fixed time interval within which hydrate which becomes adhered is melted.

5. The apparatus according to claim 1, wherein the canceling device comprises a device for introducing the hydrate slurry into the supercooled aqueous solution supercooled by the first heat exchanger.

6. The apparatus according to claim 5, wherein the supercooled aqueous solution has a supercooling degree of 0.7° C. or more.

7. The apparatus according to claim 5, wherein the hydrate slurry introduced into the supercooled aqueous solution is in an amount of 1 vol % or more of the total amount of the supercooled aqueous solution.

8. The apparatus according to claim 5, wherein the hydrate slurry introduced into the supercooled aqueous solution is in an amount of 1.8 vol % or more of the total amount of the supercooled aqueous solution.

9. The apparatus according to claim 5, wherein the supercooled aqueous solution has a Reynolds number of 4500 or more.

10. The apparatus according to claim 5, wherein the hydrate slurry introduced into the supercooled aqueous solution is generated by the at least one, second heat exchanger.

11. The apparatus according to claim 5, wherein the hydrate slurry introduced into the supercooled aqueous solution is accommodated in a thermal storage tank for the hydrate slurry.

12. The apparatus according to claim 1, wherein the canceling device is selected from the group consisting of a cooling portion of a small refrigerating machine, a low-temperature protrusion, an oscillating portion of an ultrasonic oscillator, a low-frequency oscillator, a static mixer, a mixing blade and a pump.

13. The apparatus according to claim 1, wherein the guest compound is at least one compound selected from the group consisting of tetra-n-butyl ammonium salt, tetra-iso-amyl ammonium salt, tetra-n-butyl phosphonium salt and tetra-iso-amyl sulfonium salt.

14. In an apparatus for generating a hydrate slurry containing a hydrate of a guest compound produced by cooling an aqueous solution containing the guest compound at a temperature of higher than 0° C., the apparatus comprising:
- a refrigerator configured to cool a refrigerant and provide a cooled refrigerant, the refrigerator having a plurality of evaporators, the plurality of evaporators being provided so as to be switchable and the cooled refrigerant flowing in one or more of the plurality of evaporators;
- a circulation system configured to cool the aqueous solution of the guest compound by the cooled refrigerant in one or more of the plurality of the evaporators;
- a controller configured to (i) stop the cooling of the aqueous solution of the guest compound in one evaporator of the plurality of the evaporators, when a blockage of the circulation system occurs due to a hydrate which is generated by the cooling thereof, and (ii) start the cooling of the aqueous solution of the guest compound in another evaporator of the plurality of evaporators; and
- a device for supplying the refrigerant at a high temperature from the refrigerator to the evaporator in which the cooling of the aqueous solution of the guest compound is stopped so as to melt the hydrate causing the blockage of the circulation system.

15. The apparatus according to claim 14, further comprising a detector configured to detect the blockage of the circulation system.

16. The apparatus according to claim 15, wherein the detector is at least one detector selected from the group consisting of (i) a flowmeter provided on an outlet pipe of one evaporator of the plurality of evaporators, (ii) a thermometer provided on an outlet pipe of one evaporator of the plurality of evaporators and (iii) a differential pressure gauge provided across an inlet pipe and an outlet pipe of the one evaporator of the plurality of evaporators.

17. The apparatus according to claim 14, wherein the refrigerator is an absorption refrigerating machine having an absorber and has a device for supplying the refrigerant in a gaseous state generated by the generator to the evaporator of the plurality of evaporators in which the cooling of the aqueous solution of the guest compound is stopped.

18. The apparatus according to claim 14, wherein the refrigerator is a compression refrigerating machine having a compressor and a device for supplying the refrigerant in a gaseous state generated by the compressor to the evaporator of the plurality of evaporators in which the cooling of the aqueous solution of the guest compound is stopped.

19. The apparatus according to claim 14, wherein the refrigerator is a compression refrigerating machine having a condenser and a device for supplying the refrigerant in a liquid state generated by the condenser to the evaporator of the plurality of evaporators in which the cooling of the aqueous solution of the guest compound is stopped.

20. The apparatus according to any one of claims 14 to 19, wherein the aqueous solution of the guest compound is supercooled by one or more of the plurality of evaporators; and a canceling device is located on an outlet pipe of said one or more of the plurality of evaporators so as to cancel the supercooling of the aqueous solution.

21. The apparatus according to claim 20, wherein the canceling device is selected from the group consisting of a cooling portion of a small refrigerating machine, a low-temperature protrusion, an oscillating portion of an ultrasonic oscillator, a low-frequency oscillator, hydrate slurry injecting means, a static mixer, a mixing blade and a pump.

22. The apparatus according to any one of claims 14 to 19, wherein the guest compound is at least one compound selected from the group consisting of tetra-n-butyl ammonium salt, tetra-iso-amyl ammonium salt, tetra-iso-butyl phosphonium salt and tri-iso-amyl sulfonium salt.

* * * * *